(12) United States Patent
Mori et al.

(10) Patent No.: US 7,836,465 B2
(45) Date of Patent: Nov. 16, 2010

(54) TELEVISION BROADCASTING RECEIVING APPARATUS

(75) Inventors: Eiichiro Mori, Daito (JP); Senichi Furutani, Daito (JP); Kosuke Kinoshita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 532 days.

(21) Appl. No.: 11/923,975

(22) Filed: Oct. 25, 2007

(65) Prior Publication Data
US 2008/0104628 A1 May 1, 2008

(30) Foreign Application Priority Data
Oct. 26, 2006  (JP) .............................. 2006-291370

(51) Int. Cl.
*H04N 7/16* (2006.01)
*H04N 5/445* (2006.01)
(52) U.S. Cl. .............................. 725/28; 725/25; 725/50
(58) Field of Classification Search .................. 725/28, 725/50, 25
See application file for complete search history.

(56) References Cited

U.S. PATENT DOCUMENTS

| 5,828,402 | A  | * | 10/1998 | Collings ........................ 725/28 |
| 7,549,155 | B2 | * | 6/2009  | Kim .............................. 725/28 |
| 7,647,608 | B2 | * | 1/2010  | Kim et al. ....................... 725/28 |
| 7,653,922 | B2 | * | 1/2010  | Shin et al. ....................... 725/28 |
| 2003/0070162 | A1 |   | 4/2003  | Oshima et al. ............... 717/171 |
| 2003/0110488 | A1 | * | 6/2003  | Lee .............................. 725/30 |
| 2003/0163811 | A1 | * | 8/2003  | Luehrs ........................... 725/25 |
| 2006/0143648 | A1 | * | 6/2006  | Shinokawa ..................... 725/25 |
| 2007/0064734 | A1 | * | 3/2007  | Kim et al. .................... 370/468 |
| 2007/0180462 | A1 | * | 8/2007  | Shin et al. ...................... 725/28 |
| 2007/0204289 | A1 | * | 8/2007  | Kim ............................ 725/28 |
| 2007/0204296 | A1 | * | 8/2007  | Lee et al. ....................... 725/39 |
| 2007/0204304 | A1 | * | 8/2007  | Kim ............................ 725/51 |
| 2007/0214472 | A1 | * | 9/2007  | Kim et al. ....................... 725/28 |

(Continued)

FOREIGN PATENT DOCUMENTS

JP  9-73390  A  3/1997

(Continued)

OTHER PUBLICATIONS

Japanese Office Action dated Aug. 19, 2008 with English translation (Four (4) pages).

*Primary Examiner*—James Sheleheda
(74) *Attorney, Agent, or Firm*—Crowell & Moring LLP

(57) ABSTRACT

Disclosed is a television broadcasting receiving apparatus which carries out a parental control including a receiving unit to receive the television broadcasting wave, a storage unit to store a rating table which corresponds to the rating information so as to correspond to a version of the rating table, a rating table obtaining unit to obtain a rating table for the parental control included in the television broadcasting wave, a version comparing unit to compare a version of the rating table obtained by the rating table obtaining unit with the version of the rating table stored in the storage unit, an information comparing unit to compare information of the rating table obtained by the rating table obtaining unit with information of the rating table stored in the storage unit and an updating unit to update the rating table stored in the storage unit to the rating table obtained by the rating table obtaining unit.

5 Claims, 5 Drawing Sheets

U.S. PATENT DOCUMENTS

| | | |
|---|---|---|
| 2007/0220541 A1* | 9/2007 | Kim .............................. 725/28 |
| 2008/0104629 A1* | 5/2008 | Okamoto et al. ............... 725/28 |
| 2008/0127243 A1* | 5/2008 | Furutani et al. ................ 725/28 |
| 2009/0083785 A1* | 3/2009 | Choi et al. ..................... 725/28 |

FOREIGN PATENT DOCUMENTS

| | | |
|---|---|---|
| JP | 2000-32404 A | 1/2000 |
| JP | 2000-184305 A | 6/2000 |
| JP | 2003-114806 A | 4/2003 |
| JP | 2004-254130 A | 9/2004 |
| WO | WO 2005/015914 A1 | 2/2005 |

* cited by examiner

FIG.3

| RRT NAME | | XXX RATING | | |
|---|---|---|---|---|
| VERSION NO. | | 12 | | |
| RATING ITEM | | TV-AA | TV-BB | TV-CC |
| BLOCK TYPE | | ORDER | CATEGORY | CATEGORY |
| LEVEL | 0 | "" / "" | "" / "" | "" / "" |
| | 1 | ZZZ / Z | TTT / T | JKF |
| | 2 | YYY / Y | SSS / S | JJ |
| | 3 | XXX / X | RRR / R | |
| | 4 | WWW / W | QQQ / Q | |
| | 5 | VVV / V | | |
| | 6 | UUU / U | | |

TELEVISION BROADCASTING RECEIVING APPARATUS

BACKGROUND OF THE INVENTION

1. Field of the Invention

The present invention relates to a television broadcasting receiving apparatus.

2. Description of the Related Art

Conventionally, there is known a television broadcasting receiving apparatus in which information (rating information) of a parental control level is added to a video/audio data of a program in the broadcasting station side, and which restricts the viewing of the program based on the rating information so that children will not watch the programs which include violent expressions and the programs which include indecent expressions (for example, see JP2000-032404A). Further, there is known a television broadcasting receiving apparatus which displays the parental control level of the program along with the program when the program is being viewed (for example, see JP2000-184305A).

Moreover, there is known a television broadcasting receiving apparatus which compares the version of the received table information and the version of the table information which is stored in advance when variety of table information added to the video/audio data which is transmitted by digital broadcasting is received, and updates the table information when the version is updated (for example, see JP2004-254130A).

A rating table will be newly transmitted as rating information of a data structure which is different from the conventional data structure by being added to the broadcasting data. Thereby, it is obligated that the television broadcasting receiving apparatus includes a function which is capable of setting the parental control information based on the rating table. The version of the rating table is scheduled to be updated by each broadcasting station, and the version number makes one cycle when the version is updated for 32 times because the version number of the rating table is written in information of 5 bit (0 to 31).

When the power of the television broadcasting receiving apparatus is turned on again after the version number have made one cycle because the broadcasting station have carried out the updating of the version of the rating table for 32 times while the power of the television broadcasting receiving apparatus is turned off for long time, the version number of the rating table to be received matches with the version number of the rating table which is already stored before the power is turned off. Therefore, the rating table which is suppose to be updated is not updated, and as a result, there is a problem that the parental control intended by a viewer cannot be carried out.

Because the inventions disclosed in JP2000-032404A and JP2000-184305A are inventions to just carry out the parental control based on the rating information, the above-mentioned problem cannot be solved. Further, because the invention disclosed in JP2004-254130A updates the table information by comparing the versions, the problem cannot be solved.

SUMMARY OF THE INVENTION

It is, therefore, a main object of the present invention to provide a television broadcasting receiving apparatus capable of updating the rating table more surely.

According to a first aspect of the present invention, there is provided a television broadcasting receiving apparatus which carries out a parental control based on rating information of a program included in a television broadcasting wave comprising a receiving unit to receive the television broadcasting wave, a storage unit to store a rating table which corresponds to the rating information so as to correspond to a version of the rating table, a rating table obtaining unit to obtain a rating table for the parental control included in the television broadcasting wave, a version comparing unit to compare a version of the rating table obtained by the rating table obtaining unit with the version of the rating table stored in the storage unit, an item comparing unit to compare the number of a rating item, a name of the rating item and a block type of the rating table obtained by the rating table obtaining unit with the number of a rating item, a name of the rating item and a block type of the rating table stored in the storage unit, a level comparing unit to compare the number of a level, a name of the level and an abbreviation of the name of the level of the rating table obtained by the rating table obtaining unit with the number of a level, a name of the level and an abbreviation of the name of the level of the rating table stored in the storage unit, an updating unit to update the rating table stored in the storage unit to the rating table obtained by the rating table obtaining unit when it is determined that the version of the rating table obtained by the rating table obtaining unit and the version of the rating table stored in the storage unit match by the version comparing unit and it is determined that the number of the rating item, the name of the rating item and the block type of the rating table obtained by the rating table obtaining unit and the number of the rating item, the name of the rating item and the block type of the rating table stored in the storage unit do not match by the item comparing unit, or when it is determined that the number of the level, the name of the level and the abbreviation of the name of the level of the rating table obtained by the rating table obtaining unit and the number of the level, the name of the level and the abbreviation of the name of the level of the rating table stored in the storage unit do not match by the level comparing unit, a display control unit to display rating information based on the updated rating table on a display unit when the rating table stored in the storage unit is updated to the rating table obtained by the rating table obtaining unit by the updating unit, and an input unit to input setting information to set parental control information based on the rating information displayed on the display unit.

According to a second aspect of the present invention, there is provided a television broadcasting receiving apparatus which carries out a parental control based on rating information of a program included in a television broadcast wave comprising a receiving unit to receive the television broadcasting wave, a storage unit to store a rating table which corresponds to the rating information so as to correspond to a version of the rating table, a rating table obtaining unit to obtain a rating table for the parental control included in the television broadcasting wave, a version comparing unit to compare a version of the rating table obtained by the rating table obtaining unit with the version of the rating table stored in the storage unit, an information comparing unit to compare information of the rating table obtained by the rating table obtaining unit with information of the rating table stored in the storage unit when it is determined that the version of the rating table obtained by the rating table obtaining unit and the version of the rating table stored in the storage unit are same by the version comparing unit, and an updating unit to update the rating table stored in the storage unit to the rating table obtained by the rating table obtaining unit when it is determined that the information of the rating table obtained by the rating table obtaining unit and the information of the rating table stored in the storage unit do not match by the information comparing unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is a diagram for explaining an example of a RRT according to the present invention;

DESCRIPTION OF THE PREFERRED EMBODIMENTS

Hereinafter, the best mode for implementing the television broadcasting receiving apparatus according to the present invention will be described in detail with reference to the drawings.

Figure 1:
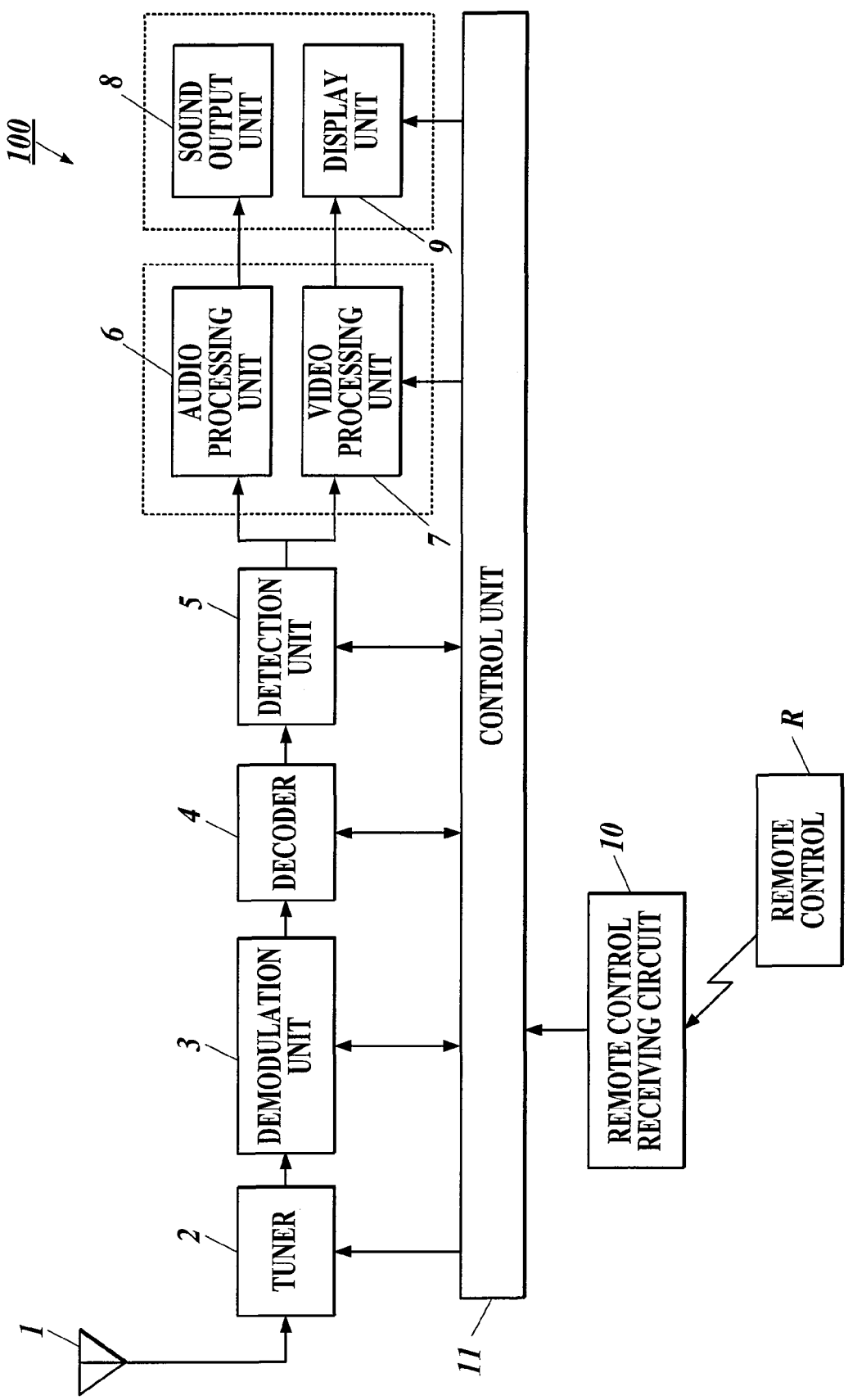
FIG. 1 is a diagram showing a schematic structure of a television broadcasting receiving apparatus according to the present invention.
Figure 2:
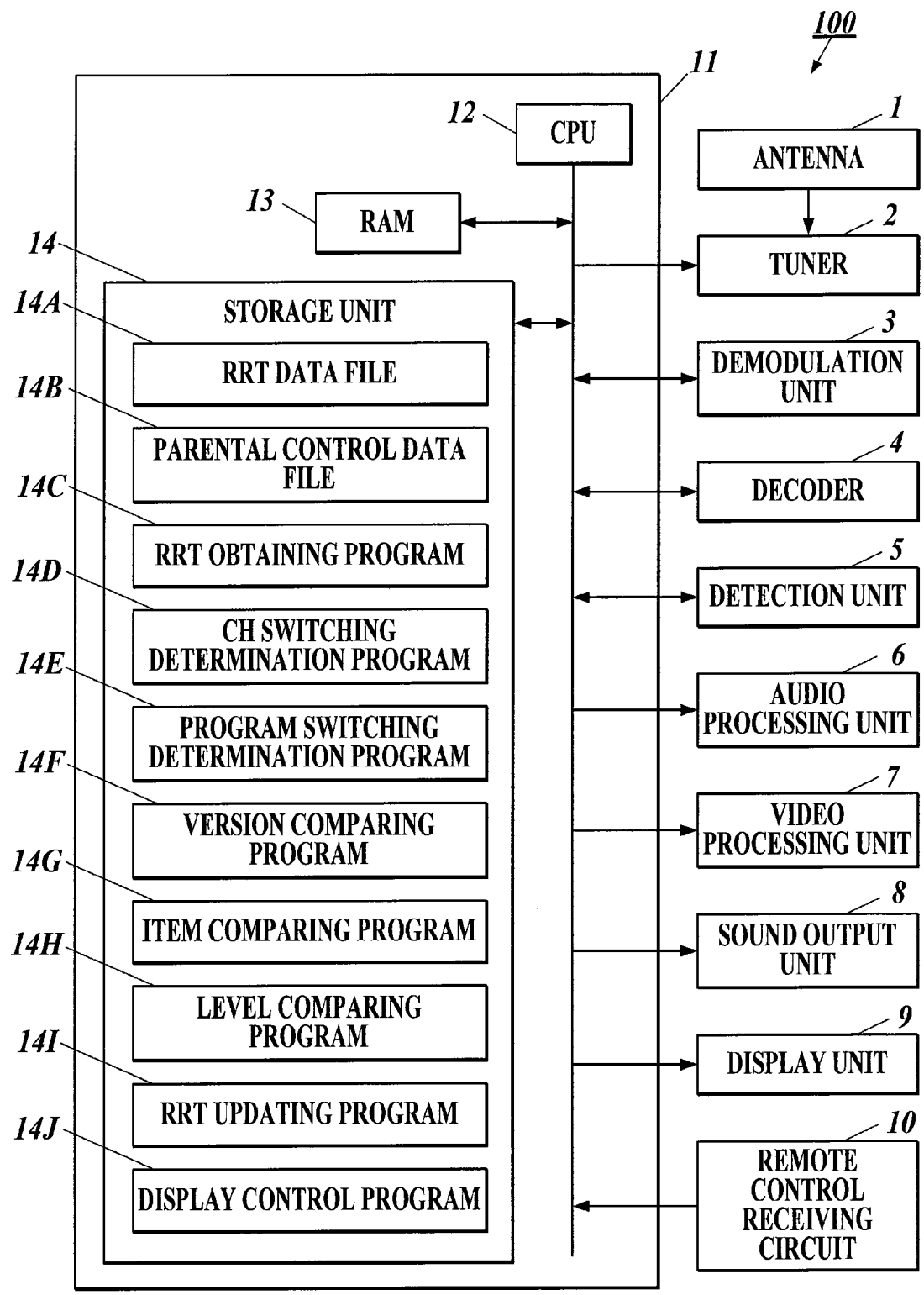
FIG. 2 is a block diagram showing a structure of the television broadcasting receiving apparatus according to the present invention.

First, a structure of a television broadcasting receiving apparatus 100 according to the present invention will be described with reference to FIGS. 1 and 2. For example, the television broadcasting receiving apparatus 100 according to the embodiment comprises an antenna 1, a tuner 2, a demodulation unit 3, a decoder 4, a detection unit 5, an audio processing unit 6, a video processing unit 7, a sound output unit 8, a display unit 9, a remote control receiving circuit 10, a remote control R, a control unit 11 and the like as shown in FIGS. 1 and 2.

For example, the antenna 1 is the parabola antenna, the UHF antenna or the like. The antenna 1 receives a broadcasting wave which includes television broadcasting signals such as terrestrial analog broadcasting, terrestrial digital broadcasting, BS/CS broadcasting and the like, and outputs RF signals of a terrestrial analog signal, a terrestrial digital signal, a BS/CS broadcasting signal and the like to the tuner 2. Thereby, the antenna 1 functions as a receiving unit. Here, when the broadcasting wave is received via the CATV circuit, a connection cable (omitted from the drawing) or the like may be provided.

The tuner 2 comprises a mixer (omitted from the drawing), a tuning circuit (omitted from the drawing), an A/D converter (omitted from the drawing) and the like. The RF signal which is input from the antenna 1 is converted to an IF (Intermediate Frequency) signal of a channel which is requested by a user by the mixer, the tuning circuit or the like, and the generated IF signal is converted to a digital data by the A/D converter.

For example, the demodulation unit 3 carries out the demodulation process or the like for the digital data which is input from the tuner 2, and outputs the processed digital data to the decoder 4.

For example, the decoder 4 generates the video/audio data (video data and audio data) and the rating information of the program by carrying out the demodulation process or the like for the digital data which is input from the demodulation unit 3, and outputs the generated video/audio data and rating information of the program to the detection unit 5. Here, the rating information is information regarding the parental control level of the program.

More particularly, for example, rating information which is defined by the MPAA (Motion Picture Association of America), rating information defined by TV Parental Guidelines and the like are known as the conventional rating information. Further, for example, there are rating information which indicates the parental control level of each program by age and rating information which indicates the parental control level of each program by the content of the program among the rating information.

As rating information specific to digital broadcasting (for example, the V-Chip2,0 in the U.S.), a rating table is newly established. As a rating table, there is a RRT (Rating Region Table), for example. Differently from the conventional rating information, the RRT indicates the parental control level of each program according to the rating items which are defined by genres or the like of the program (for example, genres such as news, movie or the like) and the rating level which is set for each rating item, for example, as shown in FIG. 3.

Moreover, in the RRT, a method (block type) of carrying out the parental control is defined for each rating item. When the block type is an order method, all the levels above the assigned rating level are parental controlled, and when the block type is a category method, only the assigned rating level is parental controlled. Further, for example, when the block type is the order method, the rating level is the same as the rating level defined by age which is used in the conventional analog broadcasting. Furthermore, for example, when the block type is the category method, the rating level is same as the rating level defined by the content of the program which is used in the conventional analog broadcasting.

For example, the RRT is identified by the RRT name and the version number (version No. in FIG. 3) because the RRT is updated in each broadcasting station.

The detection unit 5 detects the rating information from the demodulated data which is output from the decoder 4 by being controlled by the control signal which is input from the control unit 11.

For example, the audio processing unit 6 comprises a mute circuit (omitted from the drawing) and the like, and carries out the mute processing or the like for the audio data which is output from the decoder 4 by being controlled by the control signal which is input from the control unit 11.

For example, the video processing unit 7 comprises a mute circuit (omitted from the drawing) and the like, and carries out the mute processing or the like for the video data which is output from the decoder 4 by being controlled by the control signal which is input from the control unit 11. Further, for example, the video processing unit 7 combines the OSD display data for displaying the rating information on the display unit 9 to the video data which is output from the decoder 4 by being controlled by the control signal which is input from the control unit 11.

For example, the audio output unit 8 comprises a speaker or the like, and outputs the audio based on the audio data which is output from the audio processing unit 6.

For example, the display unit 9 comprises the LCD (Liquid Crystal Display), the PDP (Plasma Display Panel) or the like, and displays the video based on the video data which is output from the video processing unit 7.

For example, the remote control receiving circuit 10 outputs the operation signal which is output from the remote control R to the control unit 11. More particularly, the remote control receiving circuit 10 converts the infrared signal from the remote control R to the electric signal, and outputs the electric signal to the control unit 11.

For example, the remote control R comprises various types of keys or the like to input various types of operation signals, and outputs the various types of operation signals to the control unit 11 via the remote control receiving circuit 10 by the remote control R being operated by a user.

More particularly, for example, the remote control R functions as an input unit by inputting the setting information which sets the parental control information based on the rating information when the rating information is displayed on the display unit 9.

For example, the control unit 11 comprises a CPU (Central Processing Unit) 12, a RAM (Random Access Memory) 13, a storage unit 14 and the like as shown in FIG. 2.

For example, the CPU 12 controls the entire television broadcasting receiving apparatus 100 by reading the processing program or the like which are stored in the storage unit 14, expanding the processing program or the like in the RAM 13, and executing the processing program or the like.

The RAM 13 expands the processing program or the like which is executed by the CPU 12 in the program storage region in the RAM 13, and stores the input data and the processing results and the like which are generated when the above-mentioned processing program is executed in the data storage region.

For example, the storage unit 14 comprises a recording medium (omitted from the drawing) in which the programs, the data and the like are stored in advance, and for example, the recording medium is constituted of a semiconductor memory or the like. Further, the storage unit 14 stores various types of data and various typed of processing programs to make the CPU 12 realize the function of controlling the entire television broadcasting receiving apparatus 100, the data and the like which are processed by the CPU 12 executing the programs. More particularly, for example, the storage unit 14 stores a RRT data file 14A, a parental control data file 14B, a RRT obtaining program 14C, a CH switching determination program 14D, a program switching determination program 14E, a version comparing program 14F, an item comparing program 14G, a level comparing program 14H, a RRT updating program 14I, a display control program 14J and the like as shown in FIG. 2.

For example, the RRT data file 14A stores the RRT as a rating table which corresponds to the rating information included in the television broadcasting wave. More particularly, the RRT data file 14A stores the RRT and the version of the RRT so as to correspond to one another. The storage unit 14 functions as a storage unit by storing the RRT data file 14A.

For example, the parental control data file 14B stores the parental control information which is input from the remote control R. In the television broadcasting receiving apparatus 100, the parental control is carried out based on the parental control information which is stored in the parental control data file 14B.

For example, the RRT obtaining program 14C is a program to make the CPU 12 realize the function of obtaining the detected RRT by the CPU 12 controlling the detection unit 5 to detect the RRT. The CPU 12 functions as a rating table obtaining unit by executing the RRT obtaining program 14C.

For example, the CH switching determination program 14D is a program to make the CPU 12 realize the function of determining whether the channel has been switched or not based on the existence or non-existence of the operation signal which instructs the channel switching input from the remote control R.

For example, the program switching determination program 14E is a program to make the CPU 12 realize the function of determining whether the program has been switched or not by referring to the program information included in the television broadcasting wave.

For example, the version comparing program 14F is a program to make the CPU 12 realize the function of determining whether the version of the RRT obtained by the CPU 12 executing the RRT obtaining program 14C and the version of the RRT stored in the RRT data file 14A match or not. The CPU 12 functions as a version comparing unit by executing the version comparing program 14F.

For example, the item comparing program 14G is a program to make the CPU 12 realize the function of determining whether the rating items, the name of the rating items and the block type of the RRT obtained by the CPU 12 executing the RRT obtaining program 14C and the rating items, the name of the rating items and the block type of the RRT stored in the RRT data file 14A match or not when it is determined that the version of the RRT obtained by the CPU 12 executing the RRT obtaining program 14C and the version of the RRT stored in the RRT data file 14A match by the CPU 12 executing the version comparing program 14F. The CPU 12 function as an item comparing unit and an information comparing unit by executing the item comparing program 14G.

For example, the level comparing program 14H is a program to make the CPU 12 realize the function of determining whether the number of levels, the name of the levels and the abbreviations of the name of the levels of the RRT obtained by the CPU 12 executing the RRT obtaining program 14C and the number of levels, the name of the levels and the abbreviations of the name of the levels of the RRT stored in the RRT data file 14A match or not when it is determined that the version of the RRT obtained by the CPU 12 executing the RRT obtaining program 14C and the version of the RRT stored in the RRT data file 14A match by the CPU 12 executing the version comparing program 14F. The CPU 12 functions as a level comparing unit and an information comparing unit by executing the level comparing program 14H.

For example, the RRT updating program 14I is a program to make the CPU 12 realize the function of updating the RRT stored in the RRT data file 14A to the RRT obtained by the CPU 12 executing the RRT obtaining program 14C when it is determined that the version of the RRT obtained by the CPU 12 executing the RRT obtaining program 14C and the version of the RRT stored in the RRT data file 14A match by the CPU 12 executing the version comparing program 14F.

Further, for example, the RRT updating program 14I is a program to make the CPU 12 realize the function of updating the RRT stored in the RRT data file 14A to the RRT obtained by the CPU 12 executing the RRT obtaining program 14C when it is determined that the version of the RRT obtained by the CPU 12 executing the RRT obtaining program 14C and the version of the RRT stored in the RRT data file 14A do not match by the CPU 12 executing the version comparing program 14F, when it is determined that the number of rating items, the name of the rating items and the block type of the RRT obtained by the CPU 12 executing the RRT obtaining program 14C and the number of the rating items, the name of the rating items and the block type of the RRT stored in the RRT data file 14A do not match by the CPU 12 executing the item comparing program 14G, and when it is determined that the number of levels, the name of the levels and the abbreviations of the name of the levels of the RRT obtained by the CPU 12 executing the RRT obtaining program 14C and the number of levels, the name of the levels and the abbreviations of the name of the levels of the RRT stored in the RRT data file 14A do not match by the level comparing program 14H.

The CPU 12 functions as an updating unit by executing the RRT updating program 14I.

For example, the display control program 14J is a program to make the CPU 12 realize the function of displaying the rating information based on the RRT which is stored in the updated RRT data file 14A by the CPU 12 controlling the display unit 9 when the RRT data file 14A is updated by the CPU 12 executing the RRT updating program 14I. The CPU 12 functions as a display control unit by executing the display control program 14J.

Figure 4A:
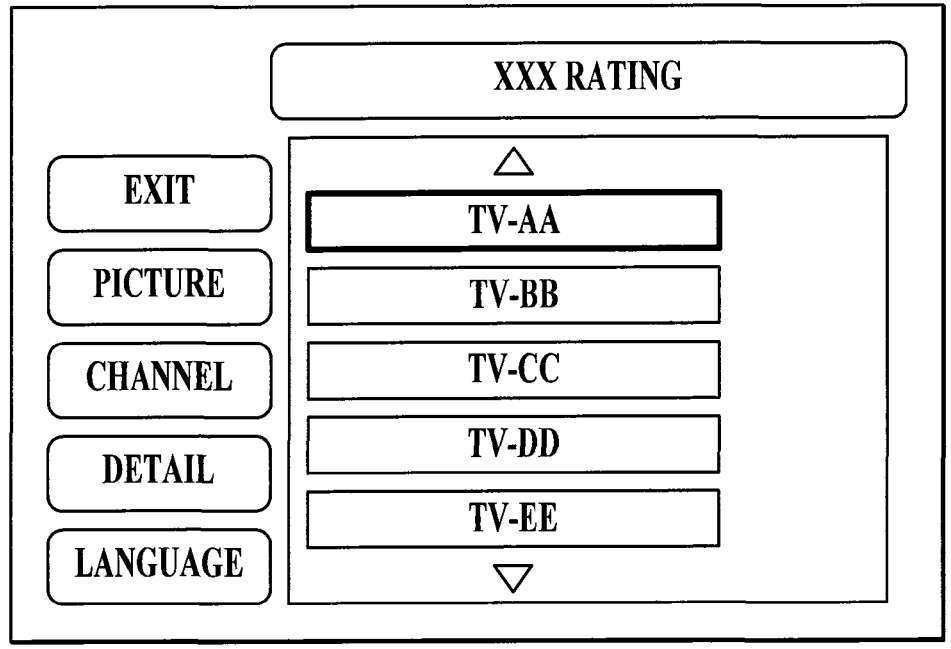
FIG. 4 is a diagram showing an example of rating information based on the RRT displayed on a display unit according to the present invention.

An example of the rating information which is displayed on the display unit 9 by the CPU 12 executing the display control program 14J is shown in FIG. 4. In FIG. 4A, the RRT name of the RRT, the rating items and various types of the operation buttons are displayed. For example, the rating item for carrying out the parental control setting can be selected by pushing an arrow key (omitted from the drawing) of the remote control R in the display screen shown in FIG. 4A to select the desired rating item, and by pushing the decision key (omitted from the drawing).

Figure 4B:
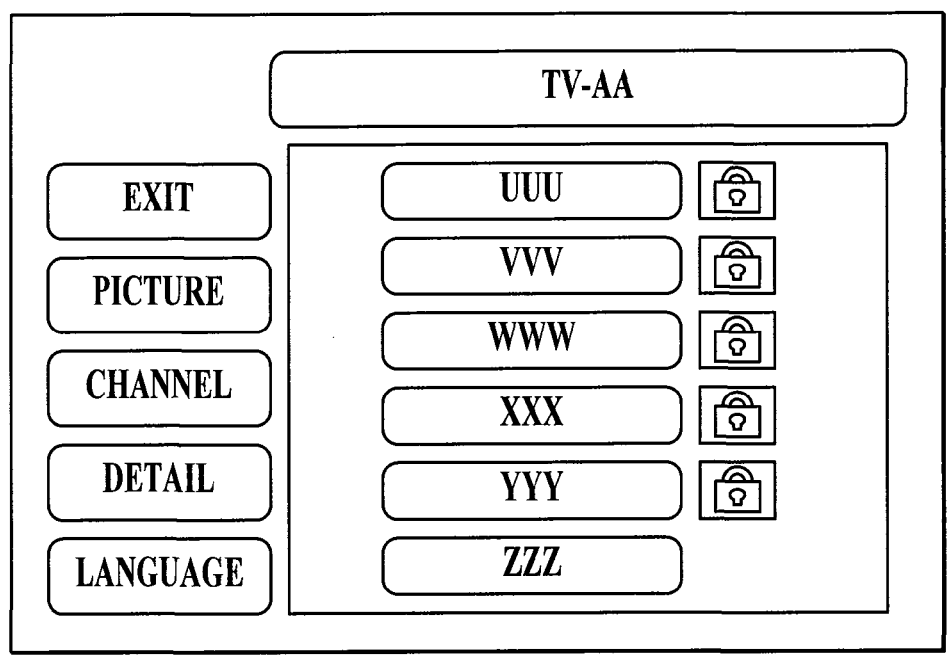

In the display screen shown in FIG. 4A, when the operation signal which selects the rating item for carrying out the parental control setting is input from the remote control R, the screen switches to the display screen which is shown in FIG. 4B, for example. In FIG. 4B, the name of the rating item (for example, TV-AA:movie) selected in FIG. 4A, the rating level which can be set in the rating item and various types of the operation buttons are displayed. The rating level for carrying out the parental control can be selected by selecting the desired rating level by pushing the arrow key (omitted from the drawing) of the remote control R in the display screen shown in FIG. 4B, and by pushing the decision key (omitted from the drawing), for example. Further, in the display screen shown in FIG. 4B, when the operation signal which selects the rating level in which the parental control is carried out is input from the remote control R, a key-hole mark is displayed besides the selected rating level, for example. Here, for example, the key-hole mark is displayed for all the rating levels which are equal to or higher than the rating level:YYY selected from the remote control R as the rating level for carrying out the parental control in the display screen shown in FIG. 4B because the block type of the rating item:TV-AA (for example, movie) which is selected in FIG. 4A is the order method.

Figure 5:
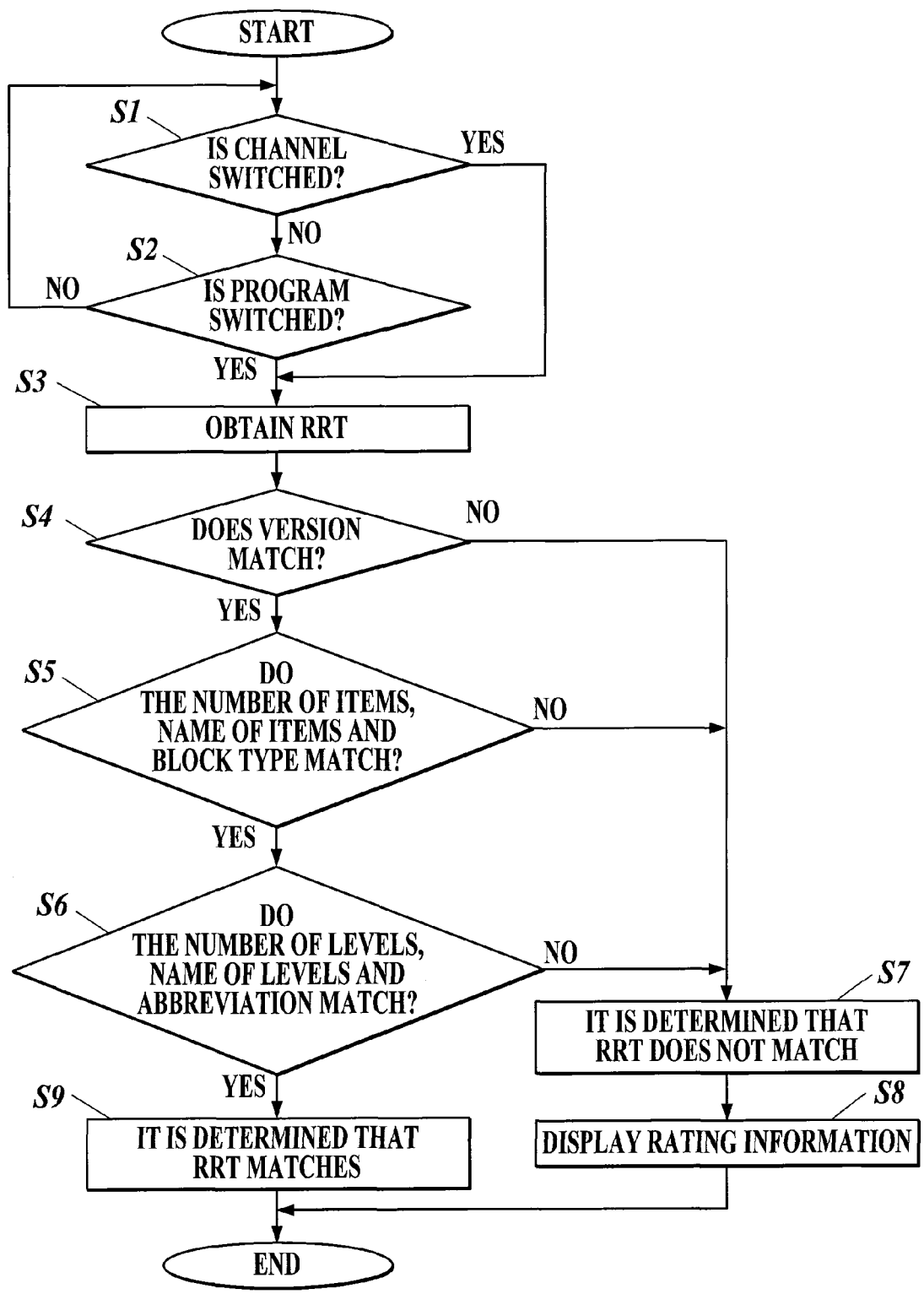
FIG. 5 is a flowchart to explain an example of an updating operation of the RRT in the television broadcasting receiving apparatus according to the present invention.

Next, the RRT updating operation in the television broadcasting receiving apparatus 100 having the above-described structure will be described with reference to the flow chart shown in FIG. 5.

First, the CPU 12 determines whether the channel is switched out not based on the existence or non-existence of the operation signal which instructs the channel switching which is input from the remote control R by the CPU 12 executing the CH switching determination program 14D (step S1).

When the CPU 12 determines that the channel is switched in step S1 (step S1; Yes), the process proceeds to step S3.

When the CPU 12 determines that the channel is not switched in step S1 (step S1; No), the CPU 12 determines whether the program is switched or not by referring to the program information included in the television broadcasting wave by the CPU 12 executing the program switching determination program 14E (step S2).

When the CPU 12 determines that the program is not switched in step S2 (step S2; No), the process returns to step S1.

When the CPU 12 determines that the program is switched in step S2 (step S2; Yes), the CPU 12 detects the RRT by controlling the detection unit 5 and obtains the detected RRT by the CPU 12 executing the RRT obtaining program 14C (step S3).

Next, the CPU 12 determines whether the version of the RRT obtained by the CPU 12 executing the RRT obtaining program 14C and the version of the RRT stored in the RRT data file 14A match or not by the CPU 12 executing the version comparing program 14F (step S4).

When the CPU 12 determines that the version of the RRT obtained by the CPU 12 executing the RRT obtaining program 14C and the version of the RRT stored in the RRT data file 14A do not match by the CPU 12 executing the version comparing program 14F in step S4 (step S4; No), the process proceeds to step S7.

When the CPU 12 determines that the version of the RRT obtained by the CPU 12 executing the RRT obtaining program 14C and the version of the RRT stored in the RRT data file 14A match by the CPU 12 executing the version comparing program 14F in Step S4 (step S4; Yes), the CPU 12 determines whether the rating items, the name of the rating items and the block type of the RRT obtained by the CPU 12 executing the RRT obtaining program 14C and the rating items, the name of the rating items and the block type of the RRT stored in the RRT data file 14A match or not by the CPU 12 executing the item comparing program 14G (step S5).

When the CPU 12 determines that the rating items, the name of the rating items and the block type of the RRT obtained by the CPU 12 executing the RRT obtaining program 14C and the rating items, the name of the rating items and the block type of the RRT stored in the RRT data file 14A do not match by the CPU 12 executing the RRT obtaining program 14C in the step S5 (step S5; No), the process proceeds to step S7.

When the CPU 12 determines that the rating items, the name of the rating items and the block type of the RRT obtained by the CPU 12 executing the RRT obtaining program 14C and the rating items, the name of the rating items and the block type of the RRT stored in the RRT data file 14A match by the CPU 12 executing the RRT obtaining program 14C in step S5 (step S5; Yes), the CPU 12 determines whether the number of levels, the name of the levels and the abbreviations of the name of the levels of the RRT obtained by the CPU 12 executing the RRT obtaining program 14C and the number of levels, the name of the levels and the abbreviations of the name of the levels of the RRT stored in the RRT data file 14A match or not by the CPU 12 executing the level comparing program 14H (step S6).

When the CPU 12 determines that the number of levels, the name of the levels and the abbreviations of the name of the levels of the RRT obtained by the CPU 12 executing the RRT obtaining program 14C and the number of levels, the name of levels and the abbreviations of the name of the levels of the RRT stored in the RRT data file 14A do not match in step S6 (step S6; No), the CPU 12 determines that the RRT obtained by the CPU 12 executing the RRT obtaining program 14C and the RRT stored in the RRT data file 14A do not match, and updates the RRT stored in the RRT data file 14A to the RRT obtained by the CPU 12 executing the RRT obtaining program 14C by the CPU 12 executing the RRT updating program 14I (step S7).

Next, the CPU 12 displays the rating information based on the RRT by controlling the display unit 9 by the CPU 12 executing the display control program 14J (step S8).

When the CPU 12 determines that the number of levels, the name of the levels and the abbreviations of the name of the levels of the RRT obtained by the CPU 12 executing the RRT obtaining program 14C and the number of levels, the name of the levels and the abbreviations of the name of the levels of the RRT stored in the RRT data file 14A match in step S6 (step S6; Yes), the CPU 12 determines that the RRT obtained by the CPU 12 executing the RRT obtaining program 14C and the RRT stored in the RRT data file 14A match (step S9), and the process is ended.

According to the television broadcasting receiving apparatus 100 in the above described embodiment of the present invention, the RRT which corresponds to the rating information is stored so as to correspond to the version of the RRT by the RRT data file 14A, the rating table for parental control which is included in the television broadcasting wave is obtained by the CPU 12 executing the RRT obtaining program 14C, the version of the RRT obtained by the CPU 12 executing the RRT obtaining program 14C and the version of the RRT stored in the RRT data file 14A are compared by the CPU 12 executing the version comparing program 14F, and the RRT stored in the RRT data file 14A is updated to the RRT obtained by the CPU 12 executing the RRT obtaining program 14C by the CPU 12 executing the RRT updating program 14I when it is determined that the version of the RRT obtained by the CPU 12 executing the RRT obtaining program 14C and the version of the RRT stored in the RRT data file 14A do not match by the CPU 12 executing the version comparing program 14F, and when it is determined that the version of the RRT obtained by the CPU 12 executing the RRT obtaining program 14C and the version of the RRT stored in the RRT data file 14A match by the CPU 12 executing the version comparing program 14F and it is determined that the number of the rating items, the name of the rating items and the block type of the RRT obtained by the CPU 12 executing the RRT obtaining program 14C and the number of the rating items, the name of the rating items and the block type of the RRT stored in the RRT data file 14A do not match by the CPU 12 executing the item comparing program 14G, or when it is determined that the number of levels, the name of the levels and the abbreviations of the name of the levels of the RRT obtained by the CPU 12 executing the RRT obtaining program 14C and the number of levels, the name of the levels and the abbreviations of the name of the levels of the RRT stored in the RRT data file 14A do not match by the CPU 12 executing the level comparing program 14H. Therefore, the RRT can be more surely updated because the RRT can be updated even when the version number makes one cycle due to the RRT being updated while the television broadcasting receiving apparatus 100 is turned off for long time.

Moreover, the number of the rating items, the name of the rating items and the block type of the RRT obtained by the CPU 12 executing the RRT obtaining program 14C and the number of the rating items, the name of the rating items and the block type of the RRT stored in the RRT data file 14A are compared by the CPU 12 executing the item comparing program 14G, and the RRT stored in the RRT data file 14A is updated to the RRT obtained by the CPU executing the RRT obtaining program 14C by the CPU 12 executing the RRT updating program 14I when it is determined that the number of the rating items, the name of the rating items and the block type of the RRT obtained by the CPU 12 executing the RRT obtaining program 14C and the number of the rating items, the name of the rating items and the block type of the RRT stored in the RRT data file 14A do not match by the CPU 12 executing the item comparing program 14G. Therefore, the RRT can be also updated when the data regarding the items of the RRT are updated.

Moreover, the number of levels, the name of the levels, the abbreviations of the name of the levels of the RRT obtained by the CPU 12 executing the RRT obtaining program 14C and the number of levels, the name of the levels, the abbreviations of the name of the levels of the RRT stored in the RRT data file 14A are compared by the CPU 12 executing the level comparing program 14H, and the RRT stored in the RRT data file 14A is updated to the RRT obtained by the CPU executing the RRT obtaining program 14C by the CPU 12 executing the RRT updating program 14I when it is determined that the number of levels, the name of the levels, the abbreviations of the name of the levels of the RRT obtained by the CPU 12 executing the RRT obtaining program 14C and the number of levels, the name of the levels, the abbreviations of the name of the levels of the RRT stored in the RRT data file 14A do not match by the CPU 12 executing the level comparing program 14H. Therefore, the RRT can be also updated when the data regarding the rating level of the RRT is updated.

Furthermore, the rating information based on the updated RRT is displayed on the display unit 9 by the CPU 12 executing the display control program 14J when the RRT stored in the RRT data file 14A is updated to the RRT obtained by the CPU 12 executing the RRT obtaining program 14C by the CPT 12 executing the RRT updating program 14I, and the setting information for setting the parental control information based on the rating information which is displayed on the display unit 9 by the remote control R. Therefore, when the RRT is updated, the rating information based on the updated RRT is displayed on the display unit 9 without a user operating in any way, and the television broadcasting receiving apparatus is convenient to use because the parental control information can be set in the display.

The television broadcasting receiving apparatus of the present invention may be anything as long as it restricts the viewing and listening of the video and the audio based on the video/audio signal. For example, the television broadcasting receiving apparatus may be a digital television, a set top box or the like.

The execution of the item comparing program 14G and the execution of the level comparing program 14H by the CPU 12 are not limited to the order described in the embodiment, and the level comparing program 14H may be carried out before the item comparing program 14G. Further, it may be structured so that either one of the item comparing program 14G and the level comparing program 14H is carried out.

According to a first aspect of the preferred embodiment of the present invention, there is provided a television broadcasting receiving apparatus which carries out a parental control based on rating information of a program included in a television broadcasting wave comprising a receiving unit to receive the television broadcasting wave, a storage unit to store a rating table which corresponds to the rating information so as to correspond to a version of the rating table, a rating table obtaining unit to obtain a rating table for the parental control included in the television broadcasting wave, a version comparing unit to compare a version of the rating table obtained by the rating table obtaining unit with the version of the rating table stored in the storage unit, an item comparing unit to compare the number of rating item(s), a name of the rating item and a block type of the rating table obtained by the rating table obtaining unit with the number of rating item(s), a name of the rating item and a block type of the rating table stored in the storage unit, a level comparing unit to compare the number of level(s), a name of the level and an abbreviation of the name of the level of the rating table obtained by the rating table obtaining unit with the number of level (s), a name of the level and an abbreviation of the name of the level of the rating table stored in the storage unit, an updating unit to update the rating table stored in the storage unit to the rating table obtained by the rating table obtaining unit when it is determined that the version of the rating table obtained by the rating table obtaining unit and the version of the rating table stored in the storage unit match by the version comparing unit and it is determined that the number of the rating item(s), the name of the rating item and the block type of the rating table obtained by the rating table obtaining unit and the number of the rating item(s), the name of the rating item and the block type of the rating table stored in the storage unit do not match by the item comparing unit, or when it is determined that the number of the level (s), the name of the level and the abbreviation of the name of the level of the rating table obtained by the rating table obtaining unit and the number of the level(s), the name of the level and the abbreviation of the name of the level of the rating table stored in the storage unit do not match by the level comparing unit, a display control unit to display rating information based on the updated rating table on a display unit when the rating table stored in the storage unit is updated to the rating table obtained by the rating table obtaining unit by the updating unit, and an input unit to input setting information to set parental control information based on the rating information displayed on the display unit.

In accordance with the first aspect of the preferred embodiment of the present invention, the rating table which corresponds to the rating information is stored so as to correspond to the version of the rating table by the storage unit, the rating table for the parental control which is included in the television broadcasting wave is obtained by the rating table obtaining unit, the version of the rating table obtained by the rating table obtaining unit and the version of the rating table stored in the storage unit are compared by the version comparing unit, and the rating table stored in the storage unit is updated to the rating table obtained by the rating table obtaining unit by the updating unit when it is determined that the version of the rating table obtained by the rating table obtaining unit and the version of the rating table stored in the storage unit match by the version comparing unit and it is determined that the number of the rating item(s), the name of the rating items and the block type of the rating table obtained by the rating table obtaining unit and the number of the rating item(s), the name of the rating items and the block type of the rating table stored in the storage unit do not match by the item comparing unit, or when it is determined that the number of level (s), the name of the levels and the abbreviations of the name of the levels of the rating table obtained by the rating table obtaining unit and the number of level(s), the name of the levels and the abbreviations of the name of the levels of the rating table stored in the storage unit do not match by the level comparing unit. Therefore, the rating table can be more surely updated because the rating table can be updated even when the version number makes one cycle due to the rating table being updated while the television broadcasting receiving apparatus is turned off for long time.

Further, the number of the rating item(s), the name of the rating items and the block type of the rating table obtained by the rating table obtaining unit and the number of the rating item(s), the name of the rating items and the block type of the rating table stored in the storage unit are compared by the item comparing unit which is provided in the information comparing unit, and the updating unit updates the rating table stored in the storage unit to the rating table obtained by the rating table obtaining unit when it is determined that the number of the rating item(s), the name of the rating items and the block type of the rating table obtained by the rating table obtaining unit and the number of the rating item(s), the name of the rating items and the block type of the rating table stored in the storage unit do not match by the item comparing unit. Therefore, the rating table can be also updated when the data regarding the items of the rating table are updated.

Furthermore, the number of level(s), the name of the levels and the abbreviations of the name of the levels of the rating table obtained by the rating table obtaining unit and the number of level(s), the name of the levels and the abbreviations of the name of the levels of the rating table stored in the storage unit are compared by the level comparing unit provided in the information comparing unit, and the updating unit updates the rating table stored in the storage unit to the rating table obtained by the rating table obtaining unit when it is determined that the number of level (s), the name of the levels and the abbreviations of the name of the levels of the rating table obtained by the rating table obtaining unit and the number of level(s), the name of the levels and the abbreviations of the name of the levels of the rating table stored in the storage unit do not match by the level comparing unit. Therefore, the rating table can be also updated when the data regarding the rating level of the rating table is updated.

Further, by the display control unit, the rating information based on the updated rating information is displayed on the display unit when the rating table stored in the storage unit is updated to the rating table obtained by the rating table obtaining unit by the updating unit, and the setting information for setting the parental control information based on the rating information which is display on the display unit is input by the input unit. Therefore, when the rating table is updated, the rating information based on the updated rating table is displayed on the display unit without a user operating in any way, and the television broadcasting receiving apparatus is convenient to use because the parental control information can be set in the display.

According to a second aspect of the preferred embodiment of the present invention, there is provided a television broadcasting receiving apparatus which carries out a parental control based on rating information of a program included in a television broadcast wave comprising a receiving unit to receive the television broadcasting wave, a storage unit to store a rating table which corresponds to the rating information so as to correspond to a version of the rating table, a rating table obtaining unit to obtain a rating table for the parental control included in the television broadcasting wave, a version comparing unit to compare a version of the rating table obtained by the rating table obtaining unit with the version of the rating table stored in the storage unit, an information comparing unit to compare information of the rating table obtained by the rating table obtaining unit with information of the rating table stored in the storage unit when it is determined that the version of the rating table obtained by the rating table obtaining unit and the version of the rating table stored in the storage unit are same by the version comparing unit, and an updating unit to update the rating table stored in the storage unit to the rating table obtained by the rating table obtaining unit when it is determined that the information of the rating table obtained by the rating table obtaining unit and the information of the rating table stored in the storage unit do not match by the information comparing unit.

In accordance with the second aspect of the preferred embodiment of the present invention, the rating table corresponding to the rating information is stored so as to correspond to the version of the rating table by the storage unit, the rating table for the parental control included in the television broadcasting wave is obtained by the rating table obtaining unit, the version of the rating table obtained by the rating table obtaining unit and the version of the rating table stored in the storage unit are compared by the version comparing unit, information of the rating table obtained by the rating table obtaining unit and information of the rating table stored in the storage unit are compared by the information comparing unit when it is determined that the version of the rating table obtained by the rating table obtaining unit and the version of the rating table stored in the storage unit are the same by the version comparing unit, and the rating table stored in the storage unit is updated to the rating table obtained by the rating table obtaining unit by the updating unit when it is determined that the information of the rating table obtained by the rating table obtaining unit and the information of the rating table stored in the storage unit do not match by the information comparing unit. Therefore, the rating table can be more surely updated because the rating table can be updated even when the version number makes one cycle due to the rating table being updated while the television broadcasting receiving apparatus is turned off for long time.

Preferably, the information comparing unit comprises an item comparing unit to compare the number of rating item(s), a name of the rating item and a block type of the rating table obtained by the rating table obtaining unit with the number of rating item(s), a name of the rating item and a block type of the rating table stored in the storing unit, and the updating unit updates the rating table stored in the storage unit to the rating table obtained by the rating table obtaining unit when it is determined that the number of the rating item(s), the name of the rating item and the block type of the rating table obtained by the rating table obtaining unit and the number of the rating item(s), the name of the rating item and the block type of the rating table stored in the storing unit do not match by the item comparing unit.

In the present invention, the same effect can be obtained. Specifically, the number of the rating item(s), the name of the rating items and the block type of the rating table obtained by the rating table obtaining unit and the number of the rating item, the name of the rating items and the block type of the rating table stored in the storage unit are compared by the item comparing unit provided in the information comparing unit, and the updating unit updates the rating table stored in the storage unit to the rating table obtained by the rating table obtaining unit when it is determined that the number of the rating item(s), the name of the rating items and the block type of the rating table obtained by the rating table obtaining unit and the number of the rating item(s), the name of the rating items and the block type of the rating table stored in the storage unit do not match by the item comparing unit. Therefore, the rating table can be also updated when the data regarding the items of the rating table are updated.

Preferably, the information comparing unit comprises a level comparing unit to compare the number of level (s), a name of the level and an abbreviation of the name of the level of the rating table obtained by the rating table obtaining unit with the number of level(s), a name of the level and an abbreviation of the name of the level of the rating table stored in the storage unit, and the updating unit updates the rating table stored in the storage unit to the rating table obtained by the rating table obtaining unit when it is determined that the number of the level(s), the name of the level and the abbreviation of the name of the level of the rating table obtained by the rating table obtaining unit and the number of the level(s), the name of the level and the abbreviation of the name of the level of the rating table stored in the storage unit do not match by the level comparing unit.

In the present invention, the same effect can be obtained. Specifically, the number of level(s), the name of the levels and the abbreviations of the name of the levels of the rating table obtained by the rating table obtaining unit and the number of level(s), the name of the levels and the abbreviations of the name of the levels of the rating table stored in the storage unit are compared by the level comparing unit provided in the information comparing unit, and the updating unit updates the rating table stored in the storing unit to the rating table obtained by the rating table obtaining unit when it is determined that the number of level (s), the name of the levels and the abbreviations of the name of the levels of the rating table obtained by the rating table obtaining unit and the number of level(s), the name of the levels and the abbreviations of the name of the levels of the rating table stored in the storage unit do not match by the level comparing unit. Therefore, the rating table can be also updated when the data regarding the rating level of the rating table is updated.

Preferably, the television broadcasting receiving apparatus further comprises a display control unit to display rating information based on an updated rating table on a display unit when the rating table stored in the storage unit is updated to the rating table obtained by the rating table obtaining unit by the updating unit and an input unit to input setting information to set parental control information based on the rating information displayed on the display unit.

In the present invention, the same effect can be obtained. Specifically, the rating information based on the updated rating table is displayed on the display unit by the display control unit when the rating table stored in the storage unit is updated to the rating table obtained by the rating table obtaining unit by the updating unit, and the setting information for setting the parental control information based on the rating information which is displayed on the display unit is input by the input unit. Therefore, when the rating table is updated, the rating information based on the updated rating table is displayed on the display unit without a user operating in any way, and the television broadcasting receiving apparatus is convenient to use because the parental control information can be set in the display.

The entire disclosure of Japanese Patent Application No. 2006-291370 filed on Oct. 26, 2006 including description, claims, drawings, and abstracts are incorporated herein by reference in its entirety.

Although various exemplary embodiments have been shown and described, the invention is not limited to the embodiment shown. Therefore, the scope of the invention is intended to be limited solely by the scope of the claims that follow.

What is claimed is:

1. A television broadcasting receiving apparatus which carries out a parental control based on rating information of a program included in a television broadcasting wave, comprising:
   a receiving unit to receive the television broadcasting wave;
   a storage unit to store a rating table which corresponds to the rating information so as to correspond to a version of the rating table;
   a rating table obtaining unit to obtain a rating table for the parental control included in the television broadcasting wave;

a version comparing unit to compare a version of the rating table obtained by the rating table obtaining unit with the version of the rating table stored in the storage unit;

an item comparing unit to compare the number of rating item(s), a name of the rating item and a block type of the rating table obtained by the rating table obtaining unit with the number of rating item(s), a name of the rating item and a block type of the rating table stored in the storage unit;

a level comparing unit to compare the number of level(s), a name of the level and an abbreviation of the name of the level of the rating table obtained by the rating table obtaining unit with the number of level(s), a name of the level and an abbreviation of the name of the level of the rating table stored in the storage unit;

an updating unit to update the rating table stored in the storage unit to the rating table obtained by the rating table obtaining unit when it is determined that the version of the rating table obtained by the rating table obtaining unit and the version of the rating table stored in the storage unit match by the version comparing unit and it is determined that the number of the rating item(s), the name of the rating item and the block type of the rating table obtained by the rating table obtaining unit and the number of the rating item(s), the name of the rating item and the block type of the rating table stored in the storage unit do not match by the item comparing unit, or when it is determined that the number of the level(s), the name of the level and the abbreviation of the name of the level of the rating table obtained by the rating table obtaining unit and the number of the level(s), the name of the level and the abbreviation of the name of the level of the rating table stored in the storage unit do not match by the level comparing unit;

a display control unit to display rating information based on the updated rating table on a display unit when the rating table stored in the storage unit is updated to the rating table obtained by the rating table obtaining unit by the updating unit; and an input unit to input setting information to set parental control information based on the rating information displayed on the display unit.

2. A television broadcasting receiving apparatus which carries out a parental control based on rating information of a program included in a television broadcast wave, comprising:

a receiving unit to receive the television broadcasting wave;

a storage unit to store a rating table which corresponds to the rating information so as to correspond to a version of the rating table;

a rating table obtaining unit to obtain a rating table for the parental control included in the television broadcasting wave;

a version comparing unit to compare a version of the rating table obtained by the rating table obtaining unit with the version of the rating table stored in the storage unit;

an information comparing unit to compare information of the rating table obtained by the rating table obtaining unit with information of the rating table stored in the storage unit when it is determined that the version of the rating table obtained by the rating table obtaining unit and the version of the rating table stored in the storage unit are same by the version comparing unit; and an updating unit to update the rating table stored in the storage unit to the rating table obtained by the rating table obtaining unit when it is determined that the information of the rating table obtained by the rating table obtaining unit and the information of the rating table stored in the storage unit do not match by the information comparing unit, wherein the information comparing unit comprises an item comparing unit to compare the number of rating item(s), a name of the rating item and a block type of the rating table obtained by the rating table obtaining unit with the number of rating item(s), a name of the rating item and a block type of the rating table stored in the storing unit, and the updating unit updates the rating table stored in the storage unit to the rating table obtained by the rating table obtaining unit when it is determined that the number of the rating item(s), the name of the rating item and the block type of the rating table obtained by the rating table obtaining unit and the number of the rating item(s), the name of the rating item and the block type of the rating table stored in the storing unit do not match by the item comparing unit.

3. The television broadcasting receiving apparatus as claimed in claim 2, further comprising:

a display control unit to display rating information based on an updated rating table on a display unit when the rating table stored in the storage unit is updated to the rating table obtained by the rating table obtaining unit by the updating unit; and an input unit to input setting information to set parental control information based on the rating information displayed on the display unit.

4. A television broadcasting receiving apparatus which carries out a parental control based on rating information of a program included in a television broadcast wave, comprising:

a receiving unit to receive the television broadcasting wave;

a storage unit to store a rating table which corresponds to the rating information so as to correspond to a version of the rating table;

a rating table obtaining unit to obtain a rating table for the parental control included in the television broadcasting wave;

a version comparing unit to compare a version of the rating table obtained by the rating table obtaining unit with the version of the rating table stored in the storage unit;

an information comparing unit to compare information of the rating table obtained by the rating table obtaining unit with information of the rating table stored in the storage unit when it is determined that the version of the rating table obtained by the rating table obtaining unit and the version of the rating table stored in the storage unit are same by the version comparing unit; and an updating unit to update the rating table stored in the storage unit to the rating table obtained by the rating table obtaining unit when it is determined that the information of the rating table obtained by the rating table obtaining unit and the information of the rating table stored in the storage unit do not match by the information comparing unit;

wherein the information comparing unit comprises a level comparing unit to compare the number of level(s), a name of the level and an abbreviation of the name of the level of the rating table obtained by the rating table obtaining unit with the number of level(s), a name of the level and an abbreviation of the name of the level of the rating table stored in the storage unit, and the updating unit updates the rating table stored in the storage unit to the rating table obtained by the rating table obtaining unit when it is determined that the number of the level(s), the name of the level and the abbreviation of the name of the level of the rating table obtained by the rating table obtaining unit and the number of the level(s), the name of the level and the abbreviation of the name of the level of the rating table stored in the storage unit do not match by the level comparing unit.

5. The television broadcasting receiving apparatus as claimed in claim 4, further comprising:

a display control unit to display rating information based on an updated rating table on a display unit when the rating table stored in the storage unit is updated to the rating table obtained by the rating table obtaining unit by the updating unit; and an input unit to input setting information to set parental control information based on the rating information displayed on the display unit.

* * * * *